June 15, 1954 R. F. GRAY 2,681,097
MACHINE FOR AUTOGENOUSLY SEALING TOGETHER PARTS OF
AN ARTICLE FORMED OF A SYNTHETIC PLASTIC MATERIAL
Filed Jan. 6, 1951 4 Sheets-Sheet 1
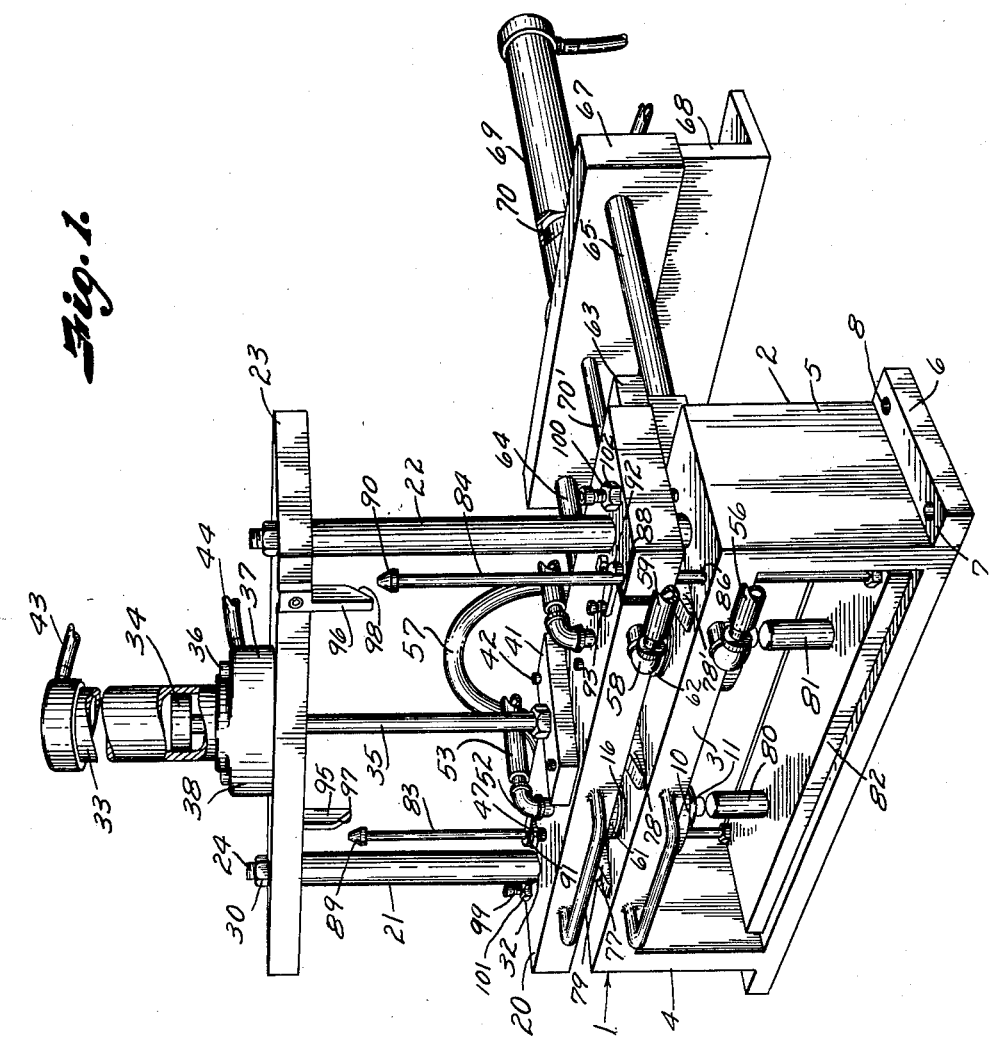
Inventor
Robert F. Gray
By Fishburnt Mullendore
Attorneys

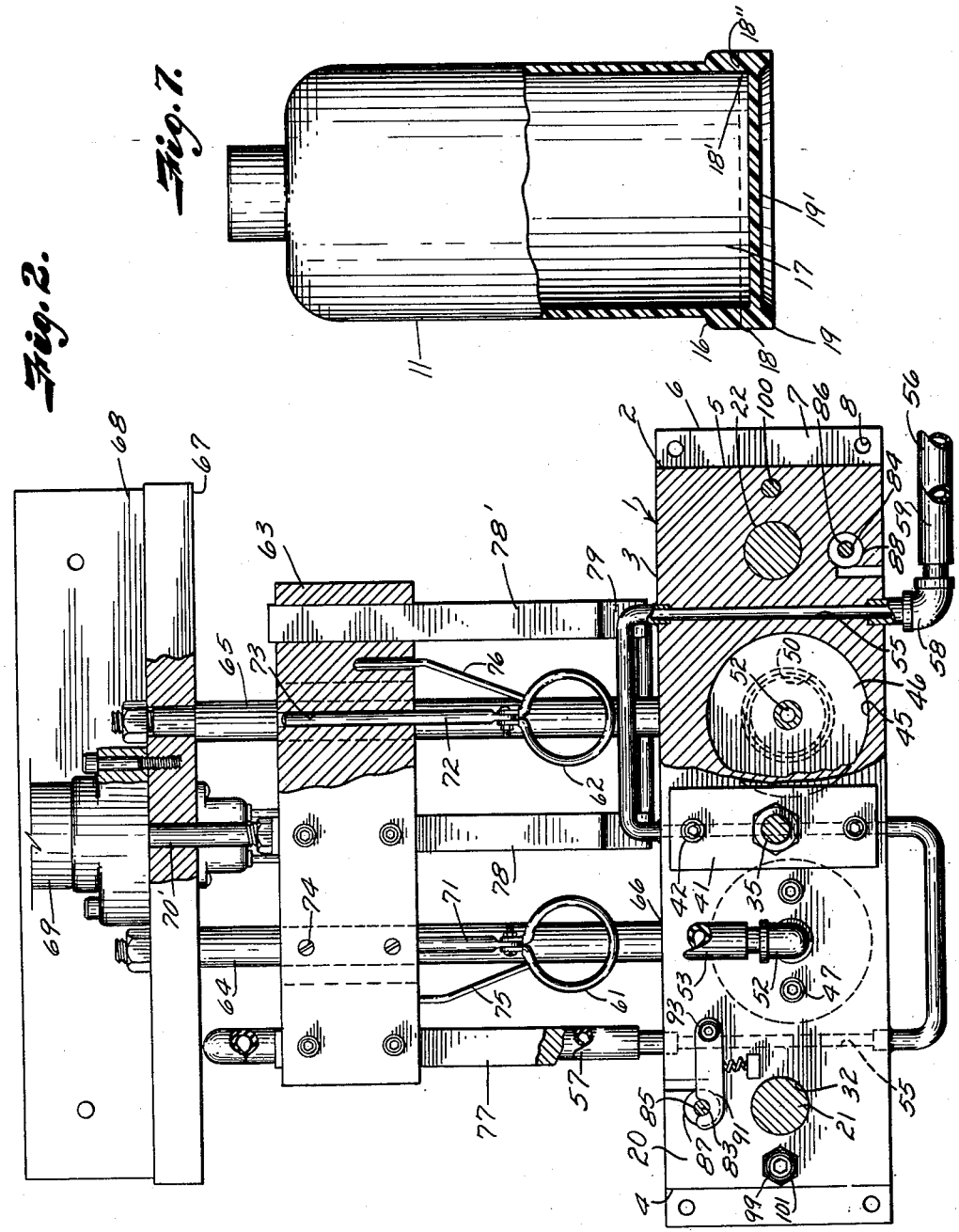

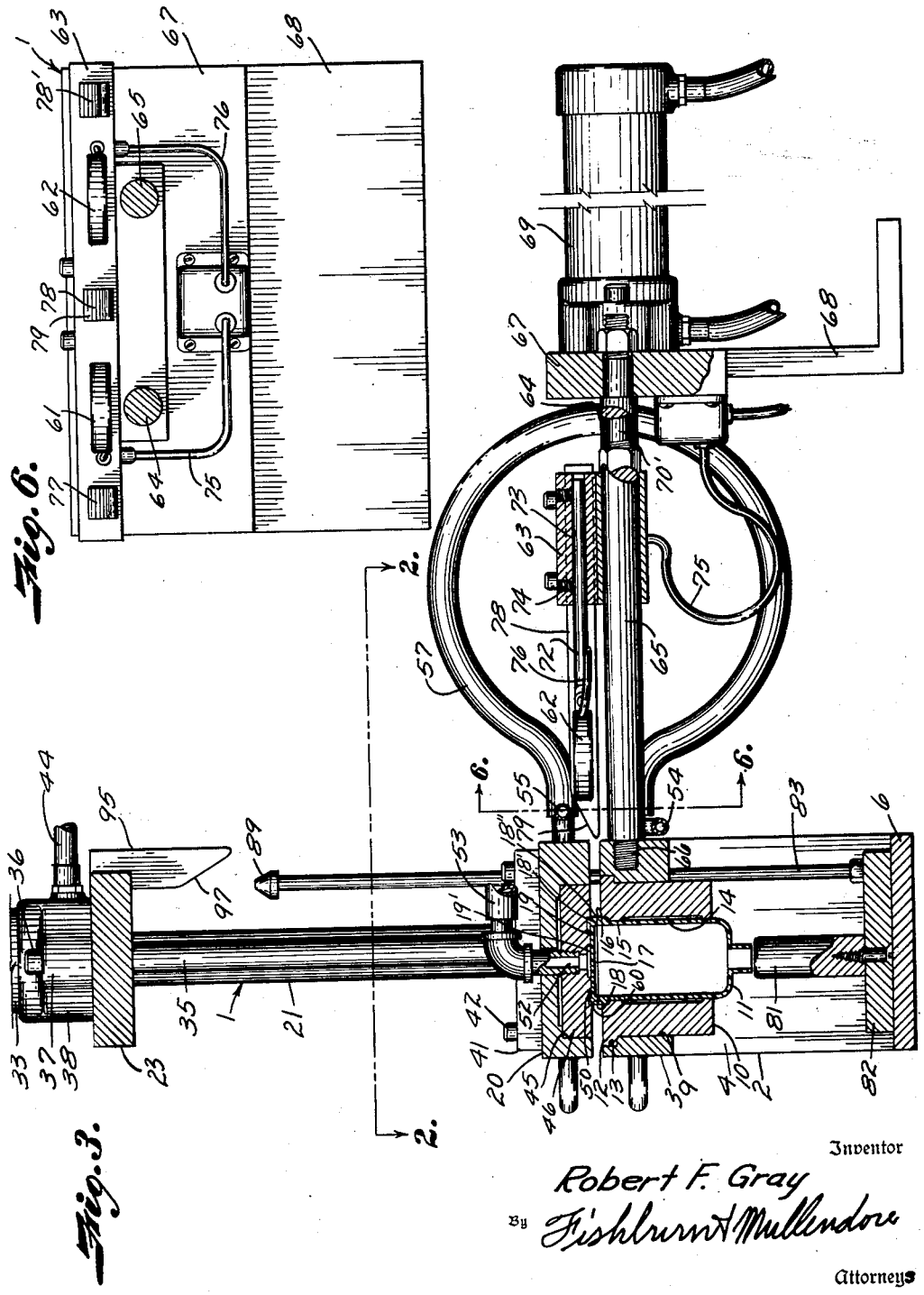

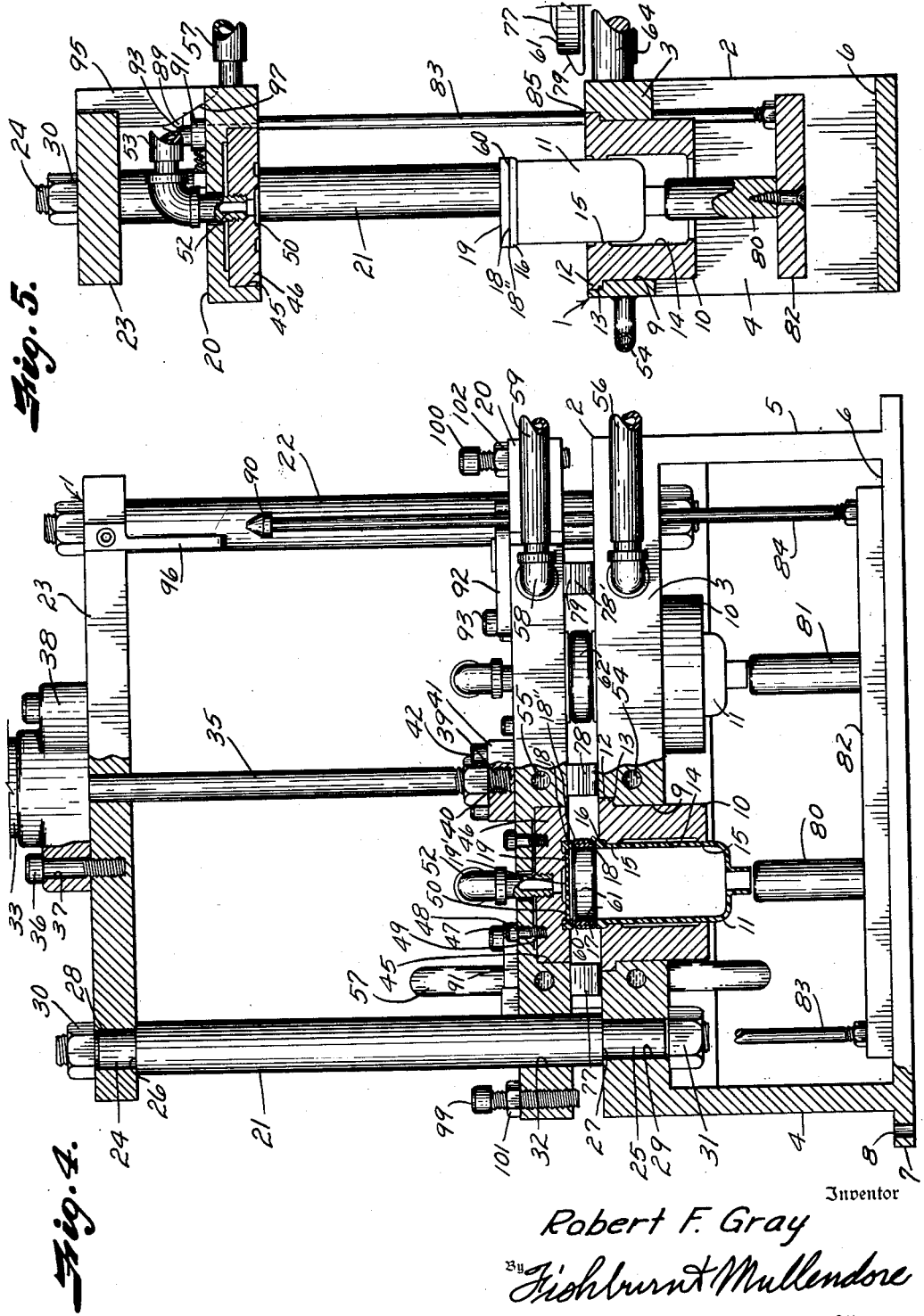

Patented June 15, 1954

2,681,097

UNITED STATES PATENT OFFICE 2,681,097

MACHINE FOR AUTOGENOUSLY SEALING TOGETHER PARTS OF AN ARTICLE FORMED OF A SYNTHETIC PLASTIC MATERIAL

Robert F. Gray, Kansas City, Mo., assignor to Injection Molding Company, Kansas City, Mo., a corporation of Missouri Application January 6, 1951, Serial No. 204,788

3 Claims. (Cl. 154—42)

This invention relates to a machine for autogenously sealing together parts of an article formed of a synthetic plastic material. For example, in the manufacture of bottles from plastic material, it is necessary to leave an opening through which the core of the mold is withdrawn and this opening must be closed by an insert formed of the same material.

The principal object of the present invention is to provide a machine of this character wherein the contact surfaces of the synthetic plastic parts are heated by radiant heat to cause fusion of the material at the contact areas and to subsequently bring the parts into contacts for effecting an autogenous seal.

Other objects of the invention are to provide a machine which is of relatively simple construction and which is positive in operation to assure leak-tight seals.

In accomplishing these and other objects of the invention as hereinafter pointed out, I have provided improved structure the preferred form of which is illustrated in the accompanying drawing wherein:

Fig. 1 is a perspective view of a machine constructed in accordance with the present invention.

Fig. 2 is a horizontal section through the machine with parts in plan being broken away and in section to better illustrate the construction, the horizontal section being taken on the line 2—2 of Fig. 3.

Fig. 3 is a longitudinal section through the machine, showing the cross head in position to effect a seal between parts of a plastic article such as a bottle.

Fig. 4 is a transverse section through the machine, showing the heater in position for fusing the contact portions of the parts of the bottle.

Fig. 5 is a fragmentary section, showing the cross head in retracted position and the ejectors discharging the finished article.

Fig. 6 is a detail section on the line 6—6 of Fig. 3.

Fig. 7 is an elevational view of the completed bottle, the lower portion of which is shown in section.

Referring more in detail to the drawings:

I designates a machine constructed in accordance with the present invention for sealing together of the parts of an article, for example, a bottle formed of synthetic plastic material. The machine includes a base 2 having a substantially rectangular top or platform 3 supported at the ends on legs 4 and 5 which extend upwardly from a floor plate 6. The parts of the base may be integrally formed as shown and the ends of the plate provided with laterally extending foot flanges 7 having apertures 8 through which fastening devices such as bolts (not shown) may be threaded into a floor or other suitable support for carrying the machine.

Formed in the top 3 of the base are a plurality of openings 9 for receiving inserts 10 adapted to support one part of the article, for example, the body portion 11 of a bottle. The inserts 10 are provided with flanges 12 which are removably engaged in annular shoulders 13 of the openings 9, as best shown in Fig. 4.

The interior of the inserts are shaped according to the article to be supported. In the illustrated instance, the inserts have axial bores 14 of a diameter to accommodate the body of the container in inverted position therein as illustrated in Figs. 3 and 4. The container is inserted in inverted position and is supported in the bore by an inset shoulder 15 that engages the base rim 16 of the body of the container. Since the interior of the bottles must be formed by retractable cores, the bottoms have openings 17 through which the cores are withdrawn. These openings are closed by disks 19 having central portions 19' conforming to the inner diameter of the bottle and to provide rims 18' having raised sealing faces 18'' which are sealed to substantially flat faces 18 encircling the openings.

The bottoms are supported in the machine on a movable carrier or cross head 20, later described. Supported by the base and extending upwardly at the respective ends of the top 3 are posts 21 and 22 that mount the cross head 20 and which are interconnected at their upper ends by a bar 23, as best shown in Figs. 1 and 4. The upper and lower ends of the posts have reduced ends 24 and 25 that form shoulders 26 and 27 which seat against the cross bar 23 and top 3 respectively when the reduced ends of the posts are inserted in openings 28 and 29, as shown in Fig. 4, and anchored therein by nuts 30 and 31 which are threaded on extensions of the upper and lower ends of the posts. The cross head 20 has an opening 32 at each end thereof to slidably mount the cross head on the posts.

Mounted on the cross bar 23 is a cylinder 33 containing a piston 34 that is connected with the cross head 20 by a piston rod 35, the cylinder being anchored in position on the cross bar 23 by cap screws 36 that extend through apertured ears 37 provided on the lower head 38 of the cylinder, as best shown in Fig. 4. The lower end of the piston rod 35 is threaded as at 39 and engaged in a threaded socket 40 of a plate 41 attached to the cross head by cap screws 42. Pressure fluid is admitted to and discharged from the respective ends of the cylinder 33 through ducts 43 and 44, Fig. 1. The undersides of the cross head are provided with recesses 45 for mounting inserts 46 adapted to carry the parts to be welded or sealed to the parts carried by the inserts 10. In the illustrated instance, the inserts 46 comprise cylindrical disks that are secured in the recesses by cap screws 47 that extend through openings 48 in the cross head and into threaded sockets 49 of the inserts. In the illustrated instance, the inserts have downwardly facing recesses 50 to accommodate the disks or bottoms 19 for the body portions of the containers which are retained in position in the inserts by vacuum drawn through ducts 52 which are connected with a suitable vacuum pump (not shown) by flexible connections 53 whereby a vacuum is drawn on the upper side of the bottle bottoms to hold them in position in the inserts as later described.

The top 3 and cross head are preferably provided with passageways 54 and 55 through which a coolant is circulated to maintain the forms sufficiently cool to prevent softening of the portions of the parts that are in contact with the inserts, the coolant being supplied to the passageways of the top 3 through a supply pipe 56. After circulation through the passageways of the base top, the coolant passes through a flexible connection 57 that is connected with the passageways of the cross head through the discharge connection 58 that is connected with a flexible discharge pipe 59.

Radiant heat is applied to the contact surfaces 18 and 60 of the base of the bottles and of the disks or bottoms 19 by means of heating elements 61 and 62 that are moved into and out of heating position by a cross head 63. The cross head 63 is slidably mounted on rods 64 and 65 that are threaded in the rear side of the base top 3 as indicated at 66, Fig. 3, and extend rearwardly therefrom for connection by a bar 67 similar to the cross bar previously described. The bar 67 is carried on a supporting bracket 68 that is adapted to bear upon the floor or other support carrying the base of the machine.

Fixed to the rear side of the bar is a pressure cylinder 69 having a piston 70 operating a piston rod 70' which is connected with the cross head 63 to slide the cross head on the guide rods 64 and 65 and move the heating elements into and out of position with respect to the parts of the container to be welded together. Since the contact areas to be fused are circular the heating elements are also circular and of a diameter corresponding thereto. The heating elements are supported from the cross head by rods 71 and 72 that are adjustably mounted in transverse bores 73 that are provided in the cross head, the rods being retained in adjusted position by set screws 74 that are threaded in the cross head and which engage the rods as shown in Fig. 3. The heating elements may be of the electrical type and supplied with electric current through conductors 75 and 76. The vertically movable cross head 29 is kept in proper spaced relation with the top 3 to permit free movement of the heating elements thereunder by arms 77, 78, and 78' which project from the cross head 63 so that when the forward ends thereof project over the base, when the cross head is shifted to move the heating elements into heating position. Therefore, the down movement of the vertically movable cross head is limited by the arms 77, 78 and 78' to maintain slight spacing between the heating elements and the surface of the parts to be heated thereby as shown in Fig. 4. The forward ends of the arms are tapered as at 79 to facilitate entrance of the arms.

To facilitate removal of the finished articles from the supporting forms, the machine is provided with ejector pins 80 and 81 that are carried on a cross bar 82 which is normally supported on the base plate 6 in coaxial alignment with the necks of the containers as best shown in Figs. 1 and 3. The cross bar 82 is carried on rods 83 and 84 that are slidable in openings 85 and 86 provided in the top of the base and through slots 87 and 88 that are formed in opposite edges of the cross head. The rods terminate below the cross bar and have heads 89 and 90 that are adapted to be engaged by latches 91 and 92 which are pivotally mounted on the cross head on pivotal connections 93 and 94 to swing across the slot-like openings and engage the rods. The latches are then in position to engage the heads 89 and 90 thereof just before the cross head has reached its upper limit of movement. Continued movement of the cross head lifts the rods to raise the cross bar and bring the ejector pins 80 and 81 into position for lifting of the containers in the supporting inserts 10 a sufficient distance to permit removal thereof by the machine operator. The latches are automatically released to permit return of the cross bar 82 by fingers 95 and 96 that are attached to the upper cross bar and which have cam-shaped depending ends 97 and 98 positioned in the path of the latches to effect swinging movement of the latches away from the rods and thereby release the latches from the heads 89 and 90.

The downward movement of the cross head is limited when the parts are in sealing position by means of set screws 99 and 100 that are threadably supported in the ends of the cross head and have ends engageable with the upper surface of the top 3. The set screws are retained in adjusted position by jam nuts 101 and 102 which are threaded thereon and engage against the upper face of the cross head.

In using the machine constructed and assembled as described, the cross head 29 is moved to retracted position to permit insertion of the body portions of the containers within the inserts 10. The body portions of the inserts are readily placed in the inserts by turning them upside down and sliding them into position until the rims 16 thereon seat upon the shoulders 15. In this position the faces 18 of the rims are slightly above the upper surface of the inserts 10.

A closure disk is then inserted in the inserts 46 of the cross head 29 so that the vacuum drawn through the ducts 52 to retain the disks while the cross head 23 is lowered toward the base. The cross head is lowered by admitting pressure fluid to act on the upper side of the piston 34 while pressure fluid is exhausted from the cylinder at the opposite side of the piston through the duct 44. During movement of the cross head 29 the cross head 63 carrying the heating elements 61 and 62 is moved into position by admitting pressure fluid to the cylinder 69 to act against the piston 70. The cross head 63 carries the heating elements into position over the open bottoms of the inserts and the stop arms 77, 78 and 78' into position where they form stops for movement of the cross head 20 so as to maintain space between the heating elements and the faces 50 of the closure disks. Sufficient time is allowed for the heating elements to radiate sufficient heat to melt the material forming said faces. The cross head carrying the heating elements are then retracted by reversing action of the piston 70. When the stop arms 77, 78, and 78' are moved out of engagement with the cross head 20, the pressure fluid in the upper cylinder continues movement of the cross head to bring the closure disk into sealing contact with the body portions of the containers, the ultimate movement and seal being controlled by adjusting the stop screws 99 and 100. After a seal is effected, the cross head 20 is returned to retracted position by applying the pressure medium to the underside of the piston 34. As soon as the latches 91 and 92 engage the heads 89 and 90 of the rods 83 and 84, the rods are raised thereby and the pins 80 and 81 effect ejection of the completed containers as shown in Fig. 5. The containers are then removed by the operator. The latches 91 and 92 are disengaged by contact with the cam ends 97 and 98 and the rods drop to return the ejecting pins 80 and 81 to retracted position, as shown in Fig. 4. The machine is then ready for another cycle of operation.

Attention is directed to the bottom of the bottle which is offset outwardly from the point of the seal, therefore, the heat required to make the seal does not distort or injure the bottom.

From the foregoing, it is obvious that I have provided a machine which effects application of closure disks or bottoms in the core openings of the body portions of molded containers in an efficient and simple manner. It is also obvious that the machine is of relatively simple construction and positive in operation.

What I claim and desire to secure by Letters Patent is:

1. A machine for uniting parts of a plastic article including a base, guides extending upwardly from the base, a cross head carried on said guides, an actuating mechanism carried by said guides and connected with the cross head to move the cross head to and from the base, inserts in the cross head and base for supporting the parts to be united, guides extending laterally from the base, a cross head carried by the lateral guides, a heating element carried by the second-named cross head, means for moving the last-named cross head to carry the heating element into and out of heating position between said inserts, spacing means carried by the second-named cross head and movable with the heating element between the base and first-named cross head to space a heating element from the parts to be united, said heating element being retractable on said lateral guides for permitting continued movement of the cross head to carry said parts into contact, an ejector supported by the base and movable in contact with the article, rods connected with the ejector and having latch engaging heads, latches carried by the first-named cross head and engageable with the latch heads upon retractive movement of said cross head to effect actuation of the ejector, and cam means carried by said guides to effect release of the latches and return of the ejector.

2. A machine for uniting parts of a plastic article including a base, guides extending upwardly from the base, a cross head carried on said guides, an actuating mechanism carried by said guides and connected with the cross head to move the cross head to and from the base, inserts in the cross head and base for supporting the parts to be united, guides extending laterally from the base, a cross head carried by the lateral guides, a heating element carried by the last-named cross head, means for moving the last-named cross head to carry the heating element into and out of heating position between said inserts, spacing means carried by the last-named cross head and movable with the heating element between the base and first-named cross head to space a heating element from the parts to be united, said heating element being retractable on said lateral guides for permitting continued movement of the cross head to carry said parts into contact, an ejector supported by the base and movable in contact with the article, rods connected with the ejector and having latch engaging heads, latches carried by the first named cross head and engageable with the latch heads upon retractive movement of said cross head to effect actuation of the ejector, cam means carried by said guides to effect release of the latches and return of the ejector, and means for supplying a cooling medium in circulation about said parts when supported by the cross head and base.

3. A machine for uniting parts of a plastic article including a base for supporting one of said parts, guides carried by the base, supporting means movable on the guides for carrying another of said parts, a heating element, means for moving the heating element between the base and said movable supporting means, actuating means for moving the heating element into and out of said position, actuating means for moving said supporting means into and out of position for effecting a seal of said parts, an ejector, means mounting the ejector for reciprocatory movement on the base with the ejector in position to engage said part, and means carried by the movable supporting means and engageable with the ejector mounting means for operating the ejector mechanism.

References Cited in the file of this patent

UNITED STATES PATENTS

| Number | Name | Date |
|---|---|---|
| 1,242,365 | Nall | Oct. 9, 1917 |
| 1,851,028 | Worrall | Mar. 29, 1932 |
| 2,000,430 | Willshaw et al. | May 7, 1935 |
| 2,379,500 | Steffens | July 3, 1945 |
| 2,516,602 | Snyder | July 25, 1950 |

FOREIGN PATENTS

| Number | Country | Date |
|---|---|---|
| 569,548 | Great Britain | May 29, 1945 |